US012736848B2

(12) United States Patent
Lee et al.

(10) Patent No.: US 12,736,848 B2
(45) Date of Patent: Sep. 15, 2026

(54) SMART ELECTROCHROMIC ELEMENT AND MANUFACTURING METHOD THEREOF

(71) Applicant: Industry-University Cooperation Foundation Hanyang University Erica Campus, Ansan-si (KR)

(72) Inventors: Sun Yong Lee, Ansan-si (KR); Min Hee Son, Ansan-si (KR); Ji Seon Kim, Ansan-si (KR)

(73) Assignee: Industry-University Cooperation Foundation Hanyang University Erica Campus, Ansan-si (KR)

(*) Notice: Subject to any disclaimer, the term of this patent is extended or adjusted under 35 U.S.C. 154(b) by 546 days.

(21) Appl. No.: 18/297,384

(22) Filed: Apr. 7, 2023

(65) Prior Publication Data

US 2023/0244116 A1 Aug. 3, 2023

Related U.S. Application Data

(63) Continuation of application No. PCT/KR2021/016384, filed on Nov. 11, 2021.

(30) Foreign Application Priority Data

Nov. 19, 2020 (KR) ........................ 10-2020-0155332
Jan. 5, 2021 (KR) ........................ 10-2021-0001001

(51) Int. Cl.
*G02F 1/1523* (2019.01)
*G02F 1/1506* (2019.01)
*G02F 1/1524* (2019.01)

(52) U.S. Cl.
CPC .......... *G02F 1/1525* (2013.01); *G02F 1/1506* (2013.01); *G02F 1/1524* (2019.01); *G02F 2201/083* (2013.01)

(58) Field of Classification Search
CPC .... G02F 1/1525; G02F 1/1506; G02F 1/1524; G02F 2201/083
See application file for complete search history.

(56) References Cited

U.S. PATENT DOCUMENTS 5,209,871 A * 5/1993 Mason .................. H01M 6/181 252/500
6,111,685 A * 8/2000 Tench .................. G02F 1/1506 359/267

(Continued)

FOREIGN PATENT DOCUMENTS

JP 6763523 B2 9/2020
KR 10-1592946 B1 2/2016

(Continued)

OTHER PUBLICATIONS

Hernandez et al. "Electrolyte for Improved Durability of Dynamic Windows Based on Reversible Metal Electrodeposition" Joule 4, 1501-1513, Jul. 15, 2020 (Year: 2020).*

(Continued)

*Primary Examiner* — George G. King
(74) *Attorney, Agent, or Firm* — Secant IP, P.L.L.C.

(57) ABSTRACT

Provided is a smart electrochromic device. The smart electrochromic device may comprise: first and second electrodes disposed facing each other; an electrochromic layer disposed between the first and second electrodes and containing a metal oxide; and an electrolyte which is disposed between the second electrode and the electrochromic layer and which contains a mixture of a first base electrolyte containing silver (Ag), a second base electrolyte containing lithium (Li), and a solvent.

8 Claims, 16 Drawing Sheets

(56) References Cited

U.S. PATENT DOCUMENTS

| | | | | |
|---|---|---|---|---|
| 10,481,461 | B2 | 11/2019 | Cho et al. | |
| 10,914,555 | B2 | 2/2021 | Kim et al. | |
| 2005/0231785 | A1* | 10/2005 | Oh | B24B 37/04 359/265 |
| 2019/0025665 | A1* | 1/2019 | Cho | G02F 1/19 |

FOREIGN PATENT DOCUMENTS

| | | | | |
|---|---|---|---|---|
| KR | 10-1638343 | B1 | 7/2016 | |
| KR | 10-2017-0142473 | A | 12/2017 | |
| KR | 10-2018-0077992 | A | 7/2018 | |
| KR | 10-2018-0127149 | A | 11/2018 | |
| KR | 10-2019-0010817 | A | 1/2019 | |
| WO | WO-2014143011 | A1 * | 9/2014 | G02F 1/155 |

OTHER PUBLICATIONS

Ye et al. "Electrodeposition-based electrochromic devices with reversible three-state optical transformation by using titanium dioxide nanoparticle modified FTO electrode" RSC Adv., 2016, 6, 30769 (Year: 2016).*

Araki et al. "Electrochemical Optical-Modulation Device with Reversible Transformation Between Transparent, Mirror, and Black" Advanced Optical Materials Adv. Mater. 2012, 24, OP122-OP126 (Year: 2012).*

Eh et al. "A copper-based reversible electrochemical mirror device with switchability between transparent, blue, and mirror states" J. Mater. Chem. C, 2017, 5, 6547 (Year: 2017).*

Son et al. "Facile Fabrication of Trimodal Switchable Mirror Device with Zero Transmittance in the Black State" DOI: 10.1002/admi.202001416, 2020 (Year: 2020).*

Goldner et al. "High near-infrared reflectivity modulation with polycrystalline electrochromic W03 films" Appl. Phys. Lett. 43, 1093- 1095, 1983 (Year: 1983).*

Barawi et al., "A dual band electrochromic device switchable across four distinct optical modes", Journal of Materials Chemistry A, 6, 10201-10205 (2018).

Son et al., "Facile Fabrication of Trimodal Switchable Mirror Device with Zero Transmittance in the Black State", Adv. Mater. Interfaces 8, 3, 2001416 (2021).

Written Opinion of the International Searching Authority mailed Feb. 11, 2022 for International Application No. PCT/KR2021/016384, 7 pages.

International Search Report of the International Searching Authority mailed Feb. 11, 2022 for International Application No. PCT/KR2021/016384, 3 pages.

* cited by examiner

Transparent mode

Near-infrared ray blocking mode

#2. $LiClO_4$ 500 mM

Transmittance (%)

100 90 80 70 60 50 40 30 20 10 0

ΔT= 39 %

Initial

Bleaching

NIR block

Mirror

Black 300 400 500 600 700 800 900

Wavelength (nm)

Figure 16:
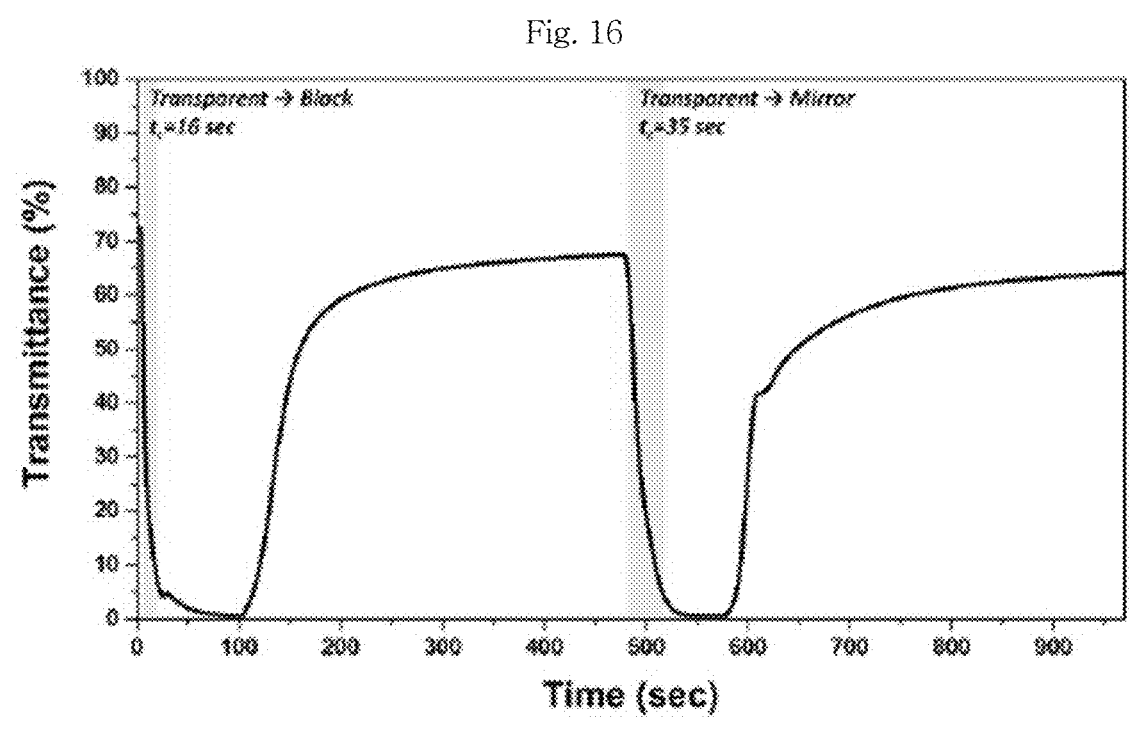

Transparent → Black
t=16 sec
Transparent → Mirror
t=35 sec
Transmittance (%)
100
90
80
70
60
50
40
30
20
10
0
0
100
200
300
400
500
600
700
800
900
Time (sec)

SMART ELECTROCHROMIC ELEMENT AND MANUFACTURING METHOD THEREOF

CROSS REFERENCE TO RELATED APPLICATIONS

This is a continuation of PCT/KR2021/016384 (filed 11 Nov. 2021), which claims the benefit of Republic of Korea Patent Application KR 10-2021-0001001 (filed 5 Jan. 2021) and Republic of Korea Patent Application KR 10-2020-0155332 (filed 19 Nov. 2020). The entire disclosure of each of these priority applications is hereby incorporated by reference herein.

TECHNICAL FIELD

The present invention relates to a smart electrochromic device and a manufacturing method thereof, and more specifically, to a smart electrochromic device and a manufacturing method thereof, capable of selectively controlling transmittance and reflectance for visible light wavelengths and transmittance and reflectance for near-infrared ray wavelengths.

BACKGROUND ART

Electrochromism is a phenomenon in which color changes reversibly due to the direction of an electric field when a voltage is applied, and a material which is reversibly changeable in optical properties of the material by an electrochemical oxidation-reduction reaction having the above characteristics is called an electrochromic material. The electrochromic material remains colorless when no electrical signal is applied from the outside and becomes colored when an electrical signal is applied, or conversely, it remains colored when no signal is applied from the outside and the color disappears when a signal is applied.

An electrochromic device uses a phenomenon in which an electrochromic material reversibly changes color due to an oxidation-reduction reaction by an externally applied voltage. Since not only visibility is secured but also a user is allowed to actively control transmittance, the electrochromic device can be changed in various color, thereby having a wide range of applications such as smart windows, car room mirrors, laptops, mobile phones, and decorative designs. Accordingly, various technologies related to the electrochromic device have been researched.

For example, Korean Unexamined Patent Publication No. 10-2017-0142473 (Application No.: 10-2016-0075980, Applicant: Jeong Soon-seong) discloses a conductive structure and an electrochromic device including the same, and the electrochromic device includes: a substrate; a first metal oxide layer provided on the substrate; a first metal layer provided on the first metal oxide layer and containing silver; a second metal oxide layer provided on the first metal layer; and a second metal layer provided on the second metal oxide layer, wherein a metal of the second metal layer has a lower oxidation level than that of silver. Further, various technologies related to electrochromic devices are continuously being researched and developed.

DISCLOSURE

Technical Problem

One technical problem to be solved by the present invention is to provide a smart electrochromic device and a manufacturing method thereof, capable of selectively controlling transmittance and reflectance for visible light wavelengths.

Another technical problem to be solved by the present invention is to provide a smart electrochromic device and a manufacturing method thereof, capable of selectively controlling transmittance and reflectance for near-infrared ray wavelengths.

Still another technical problem to be solved by the present invention is to provide a smart electrochromic device and a manufacturing method thereof to significantly reduce cracking inside an electrochromic layer.

Still another technical problem to be solved by the present invention is to provide a smart electrochromic device and a manufacturing method thereof to significantly reduce environmental pollution.

Still another technical problem to be solved by the present invention is to provide a smart electrochromic device and a manufacturing method thereof so as to be easily applicable to large-area processes.

The technical problems to be solved by the present invention are not limited to the above description.

Technical Solution

In order to solve the above-mentioned technical problems, the present invention provides a smart electrochromic device.

According to one embodiment, the smart electrochromic device includes: first and second electrodes disposed facing each other; an electrochromic layer disposed between the first and second electrodes and containing a metal oxide; and an electrolyte disposed between the second electrode and the electrochromic layer and containing a mixture of a first base electrolyte containing silver (Ag), a second base electrolyte containing lithium (Li), and a solvent, wherein transmittance and reflectance for visible light wavelengths and transmittance and reflectance for near-infrared ray wavelengths may be selectively controlled according to the movement of silver ions or lithium ions in the electrolyte.

According to one embodiment, when the lithium ions move from the electrolyte to the electrochromic layer, a near-infrared ray blocking mode may be implemented in which a visible light wavelength is transmitted and a near-infrared ray wavelength is blocked.

According to one embodiment, when all of the silver ions and the lithium ions move from the electrolyte to the electrochromic layer, a black mode may be implemented in which transmittance for visible light wavelengths is 1% or less, and reflectance for visible light wavelengths is 10% or less.

According to one embodiment, when the silver ions move from the electrolyte to the second electrode, a mirror mode may be implemented in which transmittance for visible light wavelengths is 2% or less, and reflectance for visible light wavelengths is 70% or more.

According to one embodiment, when the silver ions and the lithium ions do not move, a transparent mode may be implemented in which transmittance for visible light wavelengths is 70% or more, and reflectance for visible light wavelengths is 15% or less.

According to one embodiment, any one of the near-infrared ray blocking mode, the black mode, the mirror mode, and the transparent mode may be selectively implemented according to voltages applied to the first electrode and the second electrode.

According to one embodiment, when the concentration ratio of the second base electrolyte to the first base electrolyte is greater than 1:5 and less than 1:20, any one of the near-infrared ray blocking mode, the black mode, the mirror mode, and the transparent mode may be selectively implemented.

According to one embodiment, the second base electrolyte may include any one of lithium perchlorate (LiClO4) or lithium bis(trifluoromethanesulfonyl)imide (Li-TFSI).

According to one embodiment, in the electrochromic layer, a plurality of particles of the metal oxide may be observed.

According to one embodiment, the metal oxide may include tungsten oxide (WO3).

According to one embodiment, the first base electrolyte may include silver nitrate (AgNO3).

In order to solve the above-mentioned technical problems, the present invention provides a manufacturing method of a smart electrochromic device.

According to one embodiment, the manufacturing method of a smart electrochromic device includes: preparing a first electrode; forming an electrochromic layer containing a metal oxide on the first electrode; bonding a second electrode and the first electrode on which the electrochromic layer is formed so as to dispose the electrochromic layer therebetween; preparing an electrolyte containing a mixture of a first base electrolyte containing silver (Ag), a second base electrolyte containing lithium (Li), and a solvent; and injecting the electrolyte between the second electrode and the electrochromic layer.

According to one embodiment, in the forming of the electrochromic layer, the electrochromic layer may be formed by dry depositing the metal oxide on the first electrode.

According to one embodiment, in the preparing of the electrolyte, the mixture of the first base electrolyte, the second base electrolyte, and the solvent may be heat-treated while the first base electrolyte, the second base electrolyte, and the solvent are mixed.

Advantageous Effects

The smart electrochromic device according to the embodiment of the present invention includes: a first electrode (for example, FTO glass) and a second electrode (for example, ITO glass) disposed facing each other; an electrochromic layer disposed between the first and second electrodes and containing a metal oxide (for example, WO3); and an electrolyte disposed between the second electrode and the electrochromic layer and containing a mixture of a first base electrolyte (for example, AgNO3) containing silver (Ag), a second base electrolyte (for example, LiClO4) containing lithium (Li), and a solvent.

Accordingly, the smart electrochromic device can be configured such that transmittance and reflectance for visible light wavelengths and transmittance and reflectance for near-infrared ray wavelengths may be selectively controlled according to voltages applied to the first electrode and the second electrode. Accordingly, the smart electrochromic device may be selectively implemented in any one mode among a transparent mode of transmitting light, a black mode of blocking light, and a mirror mode of reflecting light as well as a near-infrared ray blocking mode of transmitting a visible light wavelength and blocking a near-infrared ray wavelength.

In addition, in the process of preparing the electrochromic layer, a dry deposition scheme (for example, nanoparticle deposition system) is used, so that the internal cracking of the electrochromic layer and the environmental pollution can be significantly reduced, and the large-area process can be easily applied.

DESCRIPTION OF DRAWINGS

FIG. 7 shows pictures taken of each implemented state of an electrochromic device according to Example 1 of the present invention.

FIG. 13 shows images of an electrochromic layer of a smart electrochromic device according to Example 3 of the present invention.

FIG. 16 is a graph showing the discoloration rate of the smart electrochromic device according to Example 3 of the present invention.

FIGS. 17 and 18 are graphs showing the stability of the smart electrochromic device according to Example 3 of the present invention.

BEST MODE

Mode for Invention

Hereinafter, preferred embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

Herein, when one component is mentioned as being on another component, it signifies that the one component may be placed directly on the other component or a third component may be interposed therebetween. In addition, in drawings, thicknesses of films and regions may be exaggerated to effectively describe the technology of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof. In addition, the term "connection" is used herein to include both indirectly connecting a plurality of components and directly connecting the components.

In addition, in the following description of the embodiments of the present invention, the detailed description of known functions and configurations incorporated herein will be omitted when it possibly makes the subject matter of the present invention unclear unnecessarily.

Figure 1:
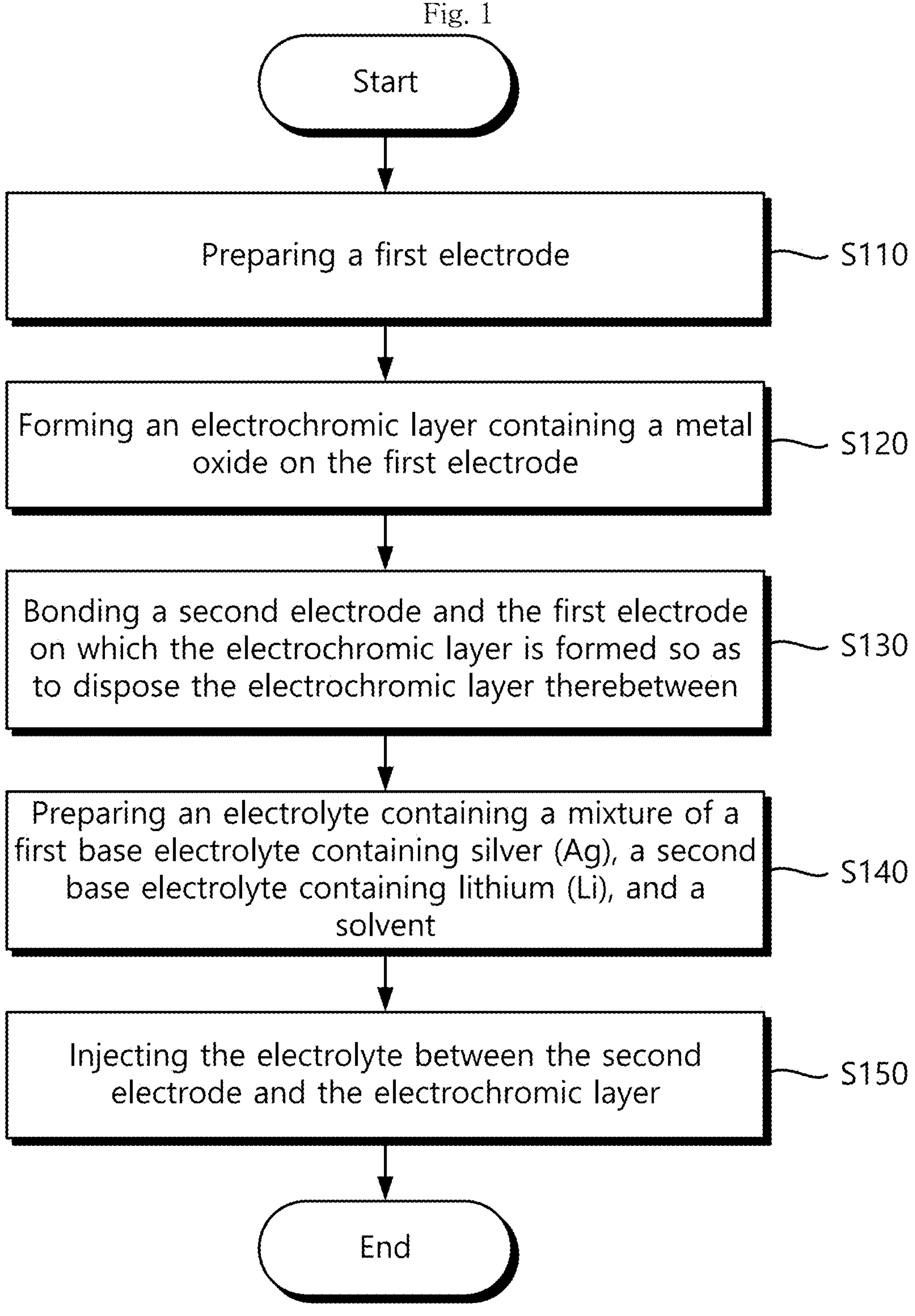
FIG. 1 is a flowchart explaining a manufacturing method of a smart electrochromic device according to the embodiment of the present invention.
Figure 2:
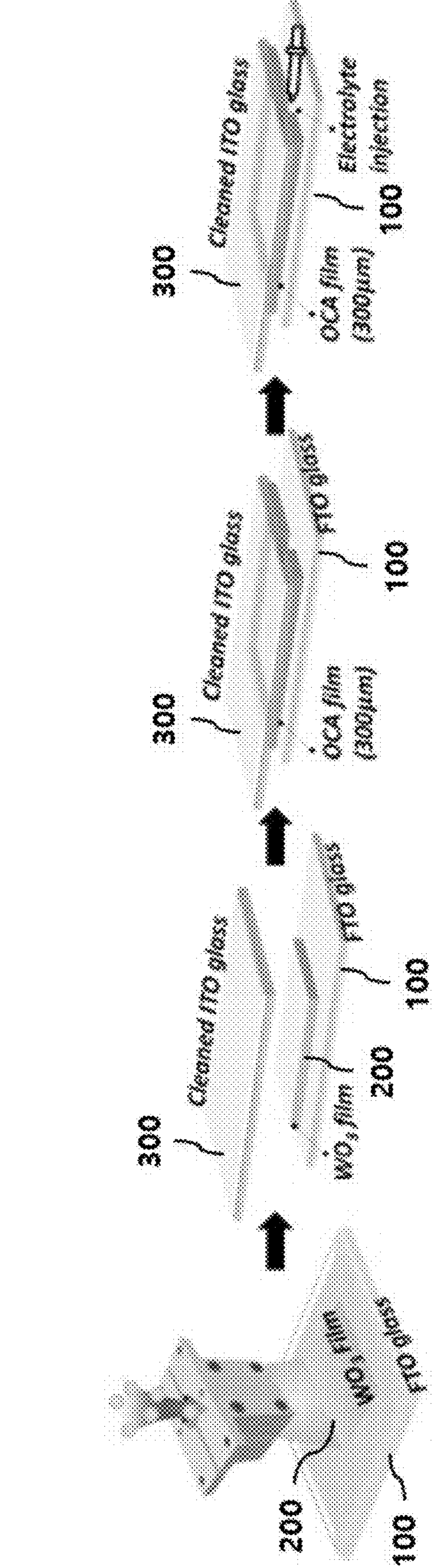
FIG. 2 is a view showing a manufacturing process of a smart electrochromic device according to the embodiment of the present invention.

FIG. 1 is a flowchart explaining a manufacturing method of a smart electrochromic device according to the embodiment of the present invention. FIG. 2 is a view showing a manufacturing process of a smart electrochromic device according to the embodiment of the present invention.

Referring to FIGS. 1 and 2, a first electrode 100 may be prepared (S100). According to one embodiment, the first electrode 100 may include fluorine tin doped oxide (FTO) glass.

An electrochromic layer 200 may be formed on the first electrode 100 (S200). According to one embodiment, the electrochromic layer 200 may include metal oxide. For example, the metal oxide may include tungsten oxide (WO3).

According to one embodiment, the electrochromic layer 200 may be formed by a dry deposition scheme. For example, powder of the metal oxide may be provided on the first electrode 100 through a nanoparticle deposition system (NPDS). On the contrary, when the electrochromic layer 200 is formed by a wet deposition scheme, internal cracks may be generated due to vaporization of a solvent in the electrochromic layer, and accordingly, the performance of the electrochromic device may be deteriorated. In addition, the wet deposition scheme may cause the environmental pollution. However, as described above, when the electrochromic layer 200 is formed by the dry deposition scheme, the internal crack generation problems and the environmental pollution problems can be significantly reduced.

In addition, as described above, when the electrochromic layer 200 is formed by the dry deposition scheme, a plurality of particles of the metal oxide may be observed in the electrochromic layer 200.

The first electrode 100 on which the electrochromic layer 200 is formed may be bonded to a second electrode 300 (S300). Specifically, the first electrode 100 and the second electrode 300 may be bonded such that the electrochromic layer 200 is disposed between the first electrode 100 and the second electrode 300. According to one embodiment, the second electrode 300 may include a material different from the first electrode 100. For example, the second electrode 300 may include indium tin oxide (ITO) glass.

An electrolyte formed by mixing a first base electrolyte containing silver (Ag), a second base electrolyte containing lithium (Li), a third base electrolyte containing bromine (Br), and a solvent may be prepared (S400). For example, the first base electrolyte may include silver nitrate (AgNO3). For example, the second base electrolyte may include any one of lithium perchlorate (LiClO4) or lithium bis(trifluoromethanesulfonyl)imide (Li-TFSI). For example, the third base electrolyte may include tetra-n-butylammonium bromide (TBABr). For example, the solvent may include dimethyl sulfoxide (DMSO).

According to one embodiment, the mixed solution of the first to third base electrolytes and the solvent may be heat-treated while the first to third base electrolytes and the solvent are mixed. For example, the mixed solution of the first to third base electrolytes and the solvent may be heat-treated at a temperature of 60° C. Accordingly, the reactivity between the second base electrolyte (for example, LiClO4) and the solvent (for example, DMSO) may be improved, so that the reliability of the electrolyte can be improved. Specifically, since an endothermic reaction occurs when the second base electrolyte (for example, LiClO4) is dissolved in the solvent (for example, DMSO), a solution formed by mixing the second base electrolyte (for example, LiClO4) with the solvent (for example, DMSO) may be heat-treated, so that the reactivity between the second base electrolyte (for example, LiClO4) and the solvent (for example, DMSO) can be improved.

In addition, according to one embodiment, in the preparing of the electrolyte, the concentration ratio between the first and second base electrolytes may be controlled. For example, the concentration ratio of the first base electrolyte (for example, AgNO3) to the second base electrolyte (for example, LiClO4) may be controlled to be greater than 1:5 and less than 1:20. Specifically, when the concentration of the first base electrolyte (for example, AgNO3) is 50 mM, the concentration of the second base electrolyte (for example, LiClO4) may be greater than 250 mM and less than 1000 mM. Accordingly, in the smart electrochromic device described later, any one of a transparent mode, a near-infrared ray blocking mode, a black mode, and a mirror mode may be selectively implemented.

On the contrary, when the concentration ratio of the first base electrolyte (for example, AgNO3) to the second base electrolyte (for example, LiClO4) is 1:5 or less or 1:20 or more, the problem of even blocking visible light wavelengths in the near-infrared ray blocking mode, and the problem of failing to implement the black mode may occur.

The electrolyte may be injected between the second electrode 300 and the electrochromic layer 200 (S500). Accordingly, the smart electrochromic device according to the embodiment can be manufactured. In the smart electrochromic device, as described above, the electrochromic layer 200 may include the metal oxide (for example, WO3), and the electrolyte may include the second base electrolyte (for example, LiClO4).

Accordingly, in the smart electrochromic device, transmittance and reflectance for visible light wavelengths and transmittance and reflectance for near-infrared ray wavelengths may be selectively controlled according to voltages applied to the first electrode 100 and the second electrode 200. Accordingly, in the smart electrochromic device, any one of a transparent mode, a near-infrared ray blocking mode, a black mode, and a mirror mode may be selectively implemented. Hereinafter, the transparent mode, the near-infrared ray blocking mode, the black mode, and the mirror mode will be described in detail.

Figure 3:
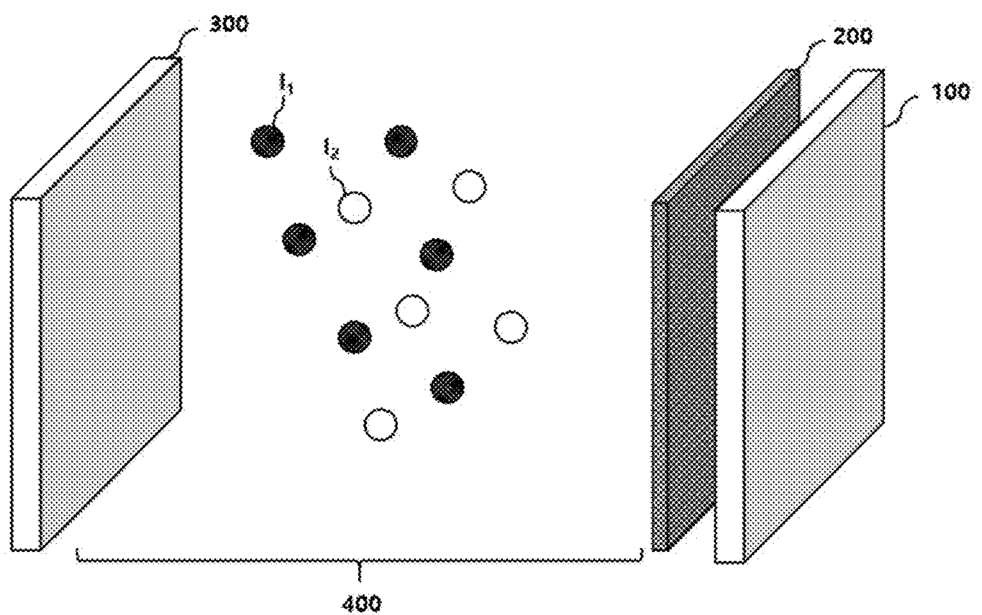
FIG. 3 is a view showing the movement of ions in an electrolyte when the smart electrochromic device according to the embodiment of the present invention is implemented in a transparent mode.
Figure 4:
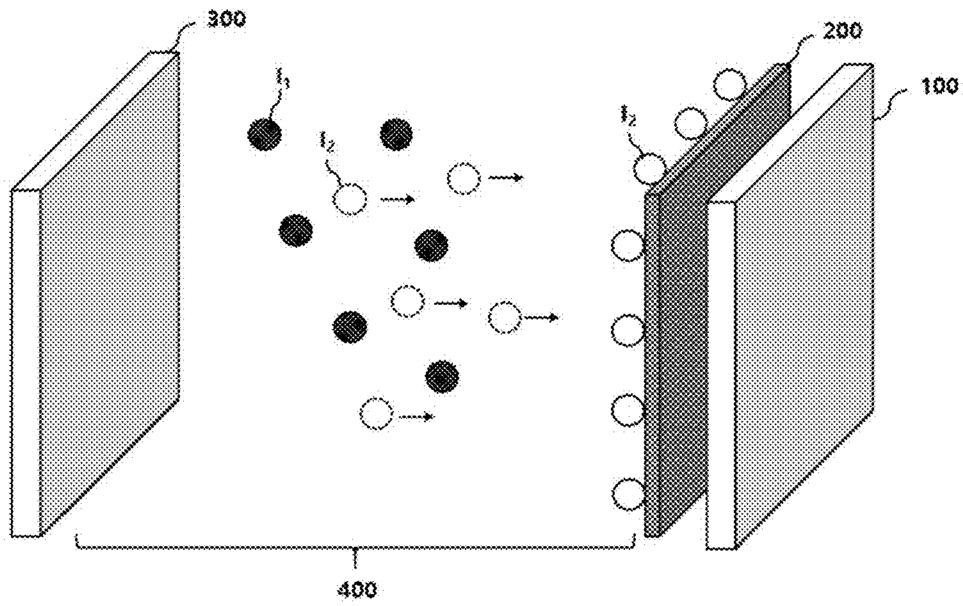
FIG. 4 is a view showing the movement of ions in an electrolyte when the smart electrochromic device according to the embodiment of the present invention is implemented in a near-infrared ray blocking mode.
Figure 5:
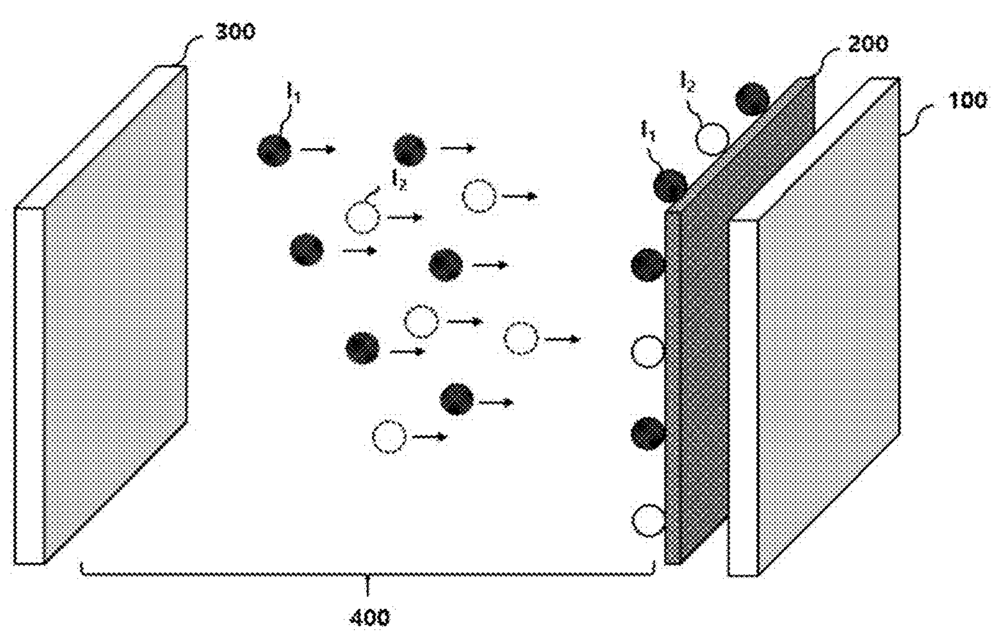
FIG. 5 is a view showing the movement of ions in an electrolyte when the smart electrochromic device according to the embodiment of the present invention is implemented in a black mode.
Figure 6:
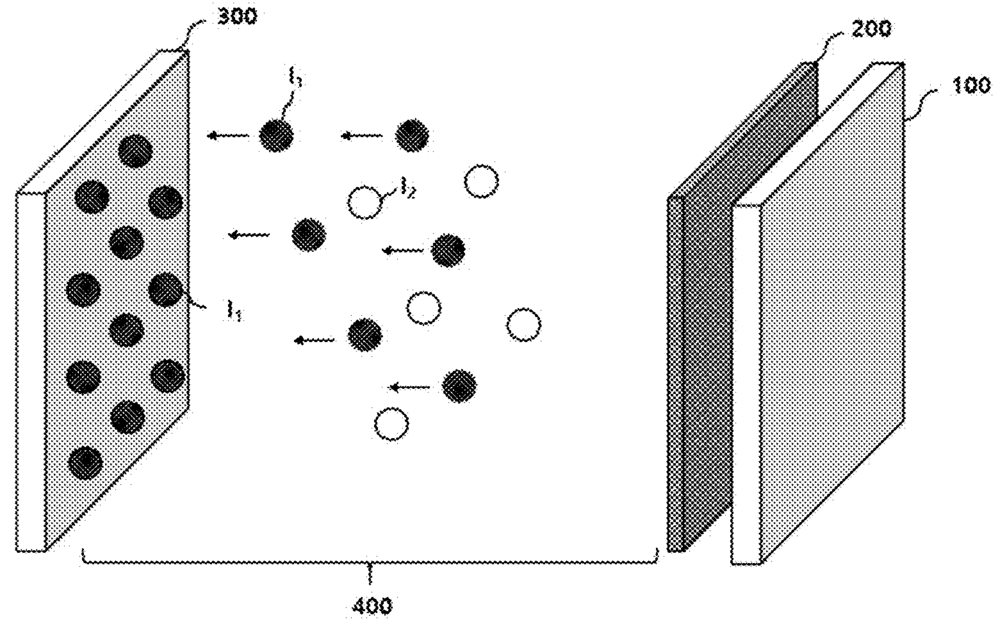
FIG. 6 is a view showing the movement of ions in an electrolyte when the smart electrochromic device according to the embodiment of the present invention is implemented in a mirror mode.

FIG. 3 is a view showing the movement of ions in an electrolyte when the smart electrochromic device according to the embodiment of the present invention is implemented in the transparent mode. FIG. 4 is a view showing the movement of ions in the electrolyte when the smart electrochromic device according to the embodiment of the present invention is implemented in the near-infrared ray blocking mode. FIG. 5 is a view showing the movement of ions in the electrolyte when the smart electrochromic device according to the embodiment of the present invention is implemented in the black mode. FIG. 6 is a view showing the movement of ions in the electrolyte when the smart electrochromic device according to the embodiment of the present invention is implemented in the mirror mode.

Transparent Mode

When a voltage is not applied to the smart electrochromic device, silver ions I1 and lithium ions I2 in an electrolyte 400 may not move as shown in FIG. 3. Accordingly, the smart electrochromic device may be implemented in the transparent mode.

When the smart electrochromic device is implemented in the transparent mode, transmittance for visible light wavelengths may be 70% or more and reflectance for visible light wavelengths may be 15% or less. In addition, when the smart electrochromic device is implemented in the transparent mode, both of the transmittance for visible light wavelengths and the transmittance for near-infrared wavelengths may be relatively high compared to the other modes described above.

Near-Infrared Ray Blocking Mode (NIR Block)

When a minus (−) voltage is applied to the first electrode 100 (FTO) of the smart electrochromic device, and a plus (+) voltage is applied to the second electrode 300 (ITO), the lithium ions I2 in the electrolyte 400 may move from the electrolyte 400 to the electrochromic layer 200 as shown in FIG. 4. On the contrary, the silver ions I1 in the electrolyte 400 may remain in the electrolyte 400. Accordingly, the smart electrochromic device may be implemented in the near-infrared ray blocking mode.

Specifically, when a voltage of −2.0 V is applied to the first electrode 100 (FTO) and a voltage of +2.0 V is applied to the second electrode 300 (ITO), the smart electrochromic device may be implemented in the near-infrared ray blocking mode.

When the smart electrochromic device is implemented in the near-infrared ray blocking mode, visible light wavelengths may be transmitted and near-infrared wavelengths may be blocked. In other words, the transmittance for visible light wavelengths may be higher than the transmittance for near-infrared wavelengths.

Black Mode (Black)

When a minus (−) voltage is applied to the first electrode 100 (FTO) of the smart electrochromic device, and a plus (+) voltage is applied to the second electrode 300 (ITO), and a voltage higher than the voltage applied to implement the near-infrared ray blocking mode is applied, both of the silver ions I1 and the lithium ions I2 in the electrolyte 400 may move from the electrolyte 400 to the electrochromic layer 200 as shown in FIG. 5. Accordingly, the smart electrochromic device may be implemented in the black mode.

Specifically, when a voltage of −3.0 V is applied to the first electrode 100 (FTO) and a voltage of +3.0 V is applied to the second electrode 300 (ITO), the smart electrochromic device may be implemented in the black mode.

When the smart electrochromic device is implemented in the black mode, transmittance for visible light wavelengths may be 1% or less and reflectance for visible light wavelengths may be 10% or less. In addition, when the smart electrochromic device is implemented in the black mode, both of the transmittance for visible light wavelengths and the transmittance for near-infrared wavelengths may be relatively low compared to the other modes described above.

Mirror Mode (Mirror)

When a plus (+) voltage is applied to the first electrode 100 (FTO) of the smart electrochromic device, and a minus (−) voltage is applied to the second electrode 300 (ITO), the silver ions I1 in the electrolyte 400 may move from the electrolyte 400 to the second electrode 300 (ITO) as shown in FIG. 6. On the contrary, the lithium ions I2 in the electrolyte 400 may remain in the electrolyte 400. Accordingly, the smart electrochromic device may be implemented in the mirror mode.

Specifically, when a voltage of +2.5 V is applied to the first electrode 100 (FTO) and a voltage of −2.5 V is applied to the second electrode 300 (ITO), the smart electrochromic device may be implemented in the mirror mode.

When the smart electrochromic device is implemented in the mirror mode, transmittance for visible light wavelengths may be 2% or less and reflectance for visible light wavelengths may be 70% or more. In addition, when the smart electrochromic device is implemented in the mirror mode, both of the reflectance for visible light wavelengths and the reflectance for near-infrared wavelengths may be relatively high compared to the other modes described above.

As a result, the smart electrochromic device according to the embodiment of the present invention may include: the first electrode 100 (FTO) and the second electrode 300 (ITO) disposed facing each other; the electrochromic layer 200 disposed between the first electrode 100 and the second electrode 300 and containing the metal oxide (WO3); and the electrolyte 400 disposed between the second electrode 300 and the electrochromic layer 200 and containing a mixture of the first base electrolyte containing silver (Ag), the second base electrolyte containing lithium (Li), and the solvent.

Accordingly, in the smart electrochromic device, transmittance and reflectance for visible light wavelengths and transmittance and reflectance for near-infrared ray wavelengths may be selectively controlled according to voltages applied to the first electrode 100 and the second electrode 200. Accordingly, the smart electrochromic device may be selectively implemented in any one mode among a transparent mode of transmitting light, a black mode of blocking light, and a mirror mode of reflecting light as well as a near-infrared ray blocking mode of transmitting a visible light wavelength and blocking a near-infrared ray wavelength.

In addition, in the process of manufacturing the electrochromic layer 200, a dry deposition scheme (for example, nanoparticle deposition system) is used, so that the internal cracking of the electrochromic layer 200 and the environmental pollution can be significantly reduced, and the large-area process can be easily applied.

The smart electrochromic device and the manufacturing method thereof according to the embodiment of the present invention have been described. Hereinafter, results on specific experimental examples and characteristic evaluations of the smart electrochromic device and the manufacturing method thereof according to the embodiment of the present invention will be described.

Manufacturing of Smart Electrochromic Device According to Example 1

FTO glass (Fluorine Tin Doped Oxide glass) and ITO glass (Indium Tin Oxide glass) washed with ethanol are prepared. In addition, an electrolyte formed by mixing AgNO3 with concentration of 50 mM, tetra-n-butylammonium bromide (TBABr) with concentration of 250 mM, LiClO4 with concentrations of 250 mM, 500 mM, 1000 mM, and dimethyl sulfoxide (DMSO) and then heat-treating the mixture at a temperature of 60° C. is prepared.

WO3 powder is dry deposited on the FTO glass with a nanoparticle deposition system (NPDS), immersed in DI water and sonicated for 20 minutes, and then dried with an air gun, thereby forming an electrochromic layer having a thickness of 400 nm.

The FTO glass formed thereon with the electrochromic layer is bonded to ITO glass such that the WO3 electrochromic layer is disposed therebetween, and the electrolyte is injected between the WO3 electrochromic layer and the ITO glass, and thus the smart electrochromic device according to Example 1 is manufactured.

A smart electrochromic device using LiClO4 at a concentration of 250 mM is defined as Example 1-1, a smart electrochromic device using LiClO4 at a concentration of 500 mM is defined as Example 1-2, and a smart electrochromic device using LiClO4 at a concentration of 1000 mM is defined as Examples 1-3. Electrolyte compositions of the smart electrochromic devices according to Examples 1-1 to 1-3 will be summarized in Table 1 below

TABLE 1

| Item | AgNO3 | LiClO4 | Concentration ratio of AgNO3:LiClO4 |
|---|---|---|---|
| Example 1-1 | 50 mM | 250 mM | 1:5 |
| Example 1-2 | 50 mM | 500 mM | 1:10 |
| Example 1-3 | 50 mM | 1000 mM | 1:20 |

Manufacturing of Smart Electrochromic Device According to Example 2

It is manufactured by the manufacturing method of the smart electrochromic device according to Example 1, in which lithium bis(trifluoromethanesulfonyl)imide (Li-TFSI) is used instead of LiClO4 in the process of preparing the electrolyte.

A smart electrochromic device using Li-TFSI at a concentration of 250 mM is defined as Example 2-1, a smart electrochromic device using Li-TFSI at a concentration of 500 mM is defined as Example 2-2, and a smart electrochromic device using Li-TFSI at a concentration of 1000 mM is defined as Example 2-3. Electrolyte compositions of the smart electrochromic devices according to Examples 1-1 to 1-3 will be summarized in Table 2 below.

TABLE 2

| Item | AgNO3 | Li-TFSI | Concentration ratio of AgNO3:Li-TFSI |
|---|---|---|---|
| Example 2-1 | 50 mM | 250 mM | 1:5 |
| Example 2-2 | 50 mM | 500 mM | 1:10 |
| Example 2-3 | 50 mM | 1000 mM | 1:20 |

Manufacturing of Smart Electrochromic Device According to Example 3

It is manufactured by the manufacturing method of the smart electrochromic device according to Example 1, in which an electrolyte obtained by mixing AgNO3, TBABr and DMSO is used.

Compositions of the electrolytes used in the smart electrochromic device according to Examples 1 to 3 will be summarized in Table 3 below.

TABLE 3

| Item | Electrolyte composition |
|---|---|
| Example 1 | AgNO3 + TBABr + DMSO + LiClO4 |
| Example 2 | AgNO3 + TBABr + DMSO + Li-TFSI |
| Example 3 | AgNO3 + TBABr + DMSO |

Figure 7:
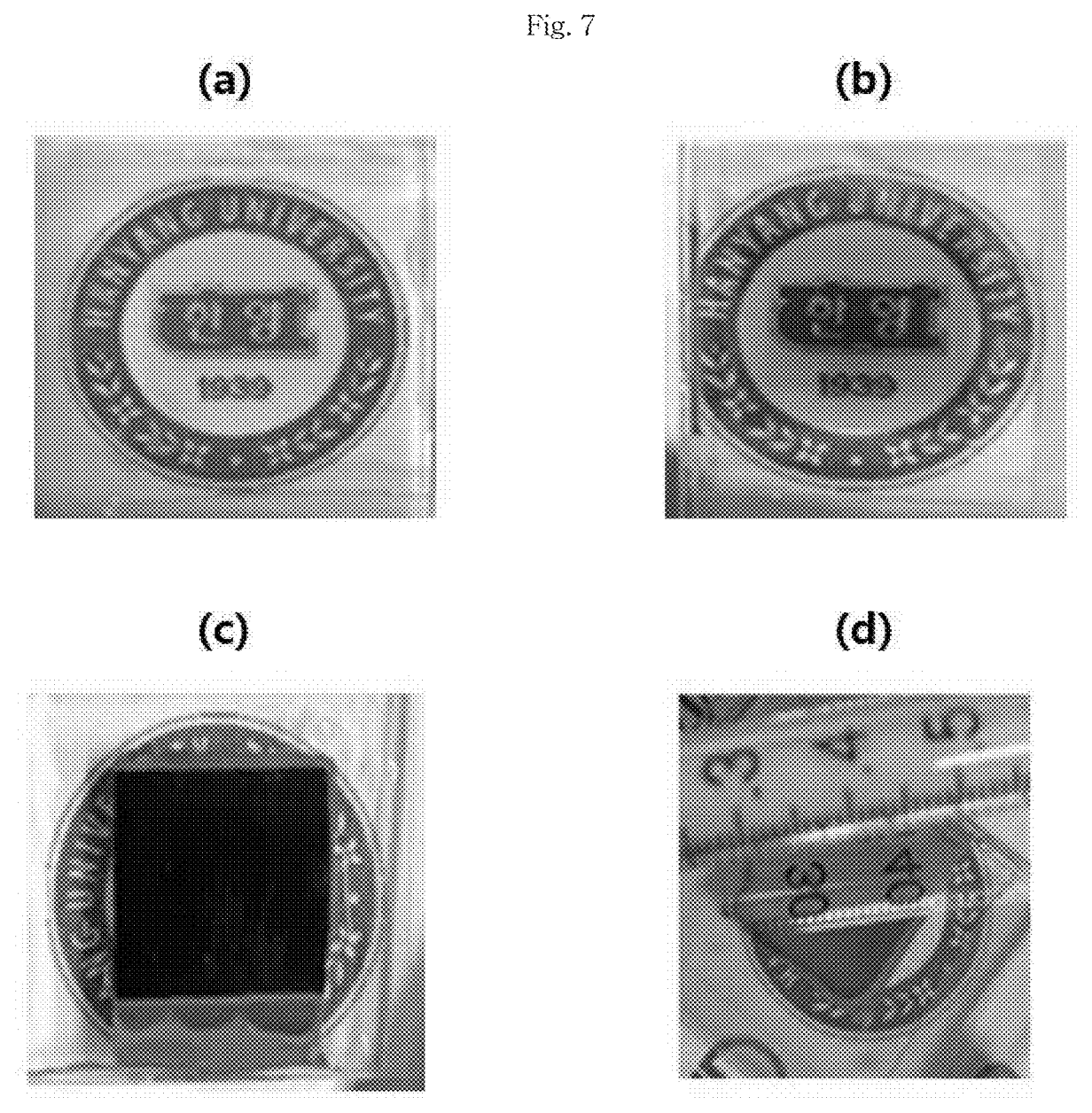

FIG. 7 shows pictures taken of each implemented state of an electrochromic device according to Example 1 of the present invention.

Referring to (a) to (d) of FIG. 7, states of the transparent mode, the near-infrared ray blocking mode, the black mode, and the mirror mode of the electrochromic device according to Example 1 are photographed and shown. Specifically, FIG. 7(*a*) shows a state of a transparent mode in which no voltage is applied; FIG. 7(*b*) shows a state of a near-infrared ray blocking mode in which a voltage of +2.0 V is applied to ITO and a voltage of −2.0 V is applied to FTO; FIG. 7(*c*) shows a state of a black mode in which +3.0 V is applied to ITO and −3.0 V is applied to FTO; and FIG. 7(*d*) shows a state of a mirror mode in which a voltage of −2.5 V is applied to ITO and a voltage of +2.5 V is applied to FTO.

However, in the mirror mode, only Ag ions are uniformly electrodeposited on ITO while moving Li ions to the opposite side (FTO). To this end, −2.0 V is applied to FTO and +2.0 V is applied to ITO for 20 seconds, and then +2.5 V is applied to FTO and −2.5 V is applied to ITO, thereby electrodepositing Ag on ITO.

As can be seen in (a) to (d) of FIG. 7, it is confirmed that the electrochromic device according to Example 1 exhibits different states according to each mode state. The voltages applied to ITO and FTO for implementing each state will be summarized in Table 4 below.

TABLE 4

| Item | ITO | FTO |
|---|---|---|
| Transparent mode | 0 V | 0 V |
| Near-infrared ray blocking mode | +2.0 V | −2.0 V |
| Black mode | +3.0 V | −3.0 V |
| Mirror mode | +2.0 V -> −2.5 V | −2.0 V -> +2.5 V |

Figure 8:
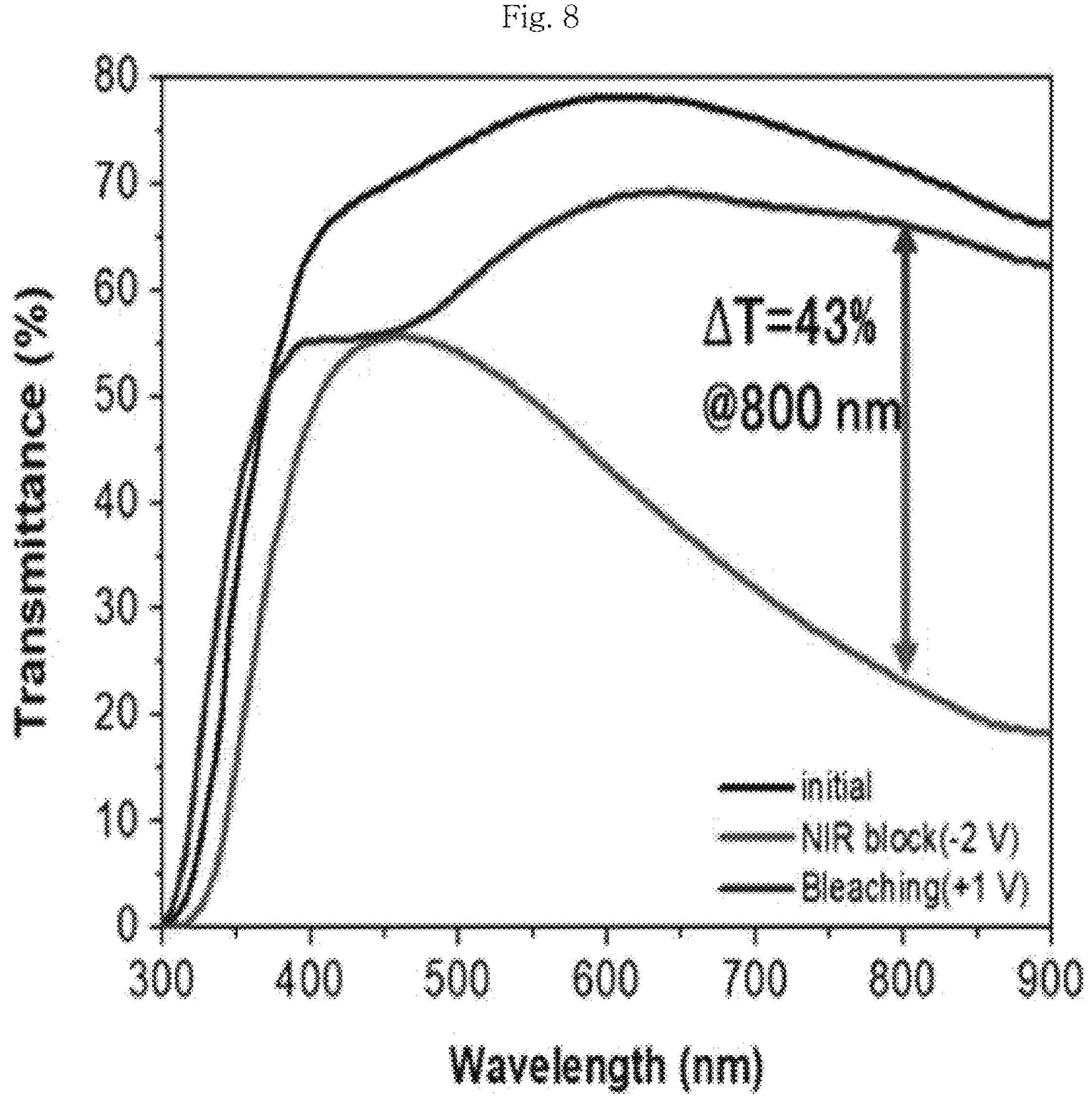
FIG. 8 is a graph showing optical characteristics when the smart electrochromic device according to Example 1 of the present invention is implemented in the near-infrared ray blocking mode.

FIG. 8 is a graph showing optical characteristics when the smart electrochromic device according to Example 1 of the present invention is implemented in the near-infrared ray blocking mode.

Referring to FIG. 8, after the smart electrochromic device according to Example 1 is prepared, transmittance (%) according to the wavelength (nm) of light applied to each of an initial state (Initial), a near-infrared ray blocking mode state (NIR block, and a bleaching state (Bleaching) is measured and shown. The bleaching state is implemented in the near-infrared ray blocking mode, and then implemented by applying a voltage of −1 V to ITO and a voltage of +1 V to FTO.

As shown in FIG. 8, it is confirmed that, when the smart electrochromic device according to Example 1 is implemented in the near-infrared ray blocking mode, the relatively high transmittance is exhibited in the visible light wavelengths (about 400 nm to about 700 nm), however, the relatively low transmittance is exhibited in the near-infrared wavelengths (about 700 nm~about 900 nm). In addition, it is confirmed that, when the mode is changed from the near-infrared ray blocking mode state to the bleaching state, the transmittance change rate ΔT for the near-infrared wavelengths is exhibited high as 43%. Accordingly, it is confirmed that the smart electrochromic device according to Example 1 can be implemented in the near-infrared ray blocking mode of transmitting the visible ray wavelengths and blocking the near-infrared ray wavelengths.

Figure 9:
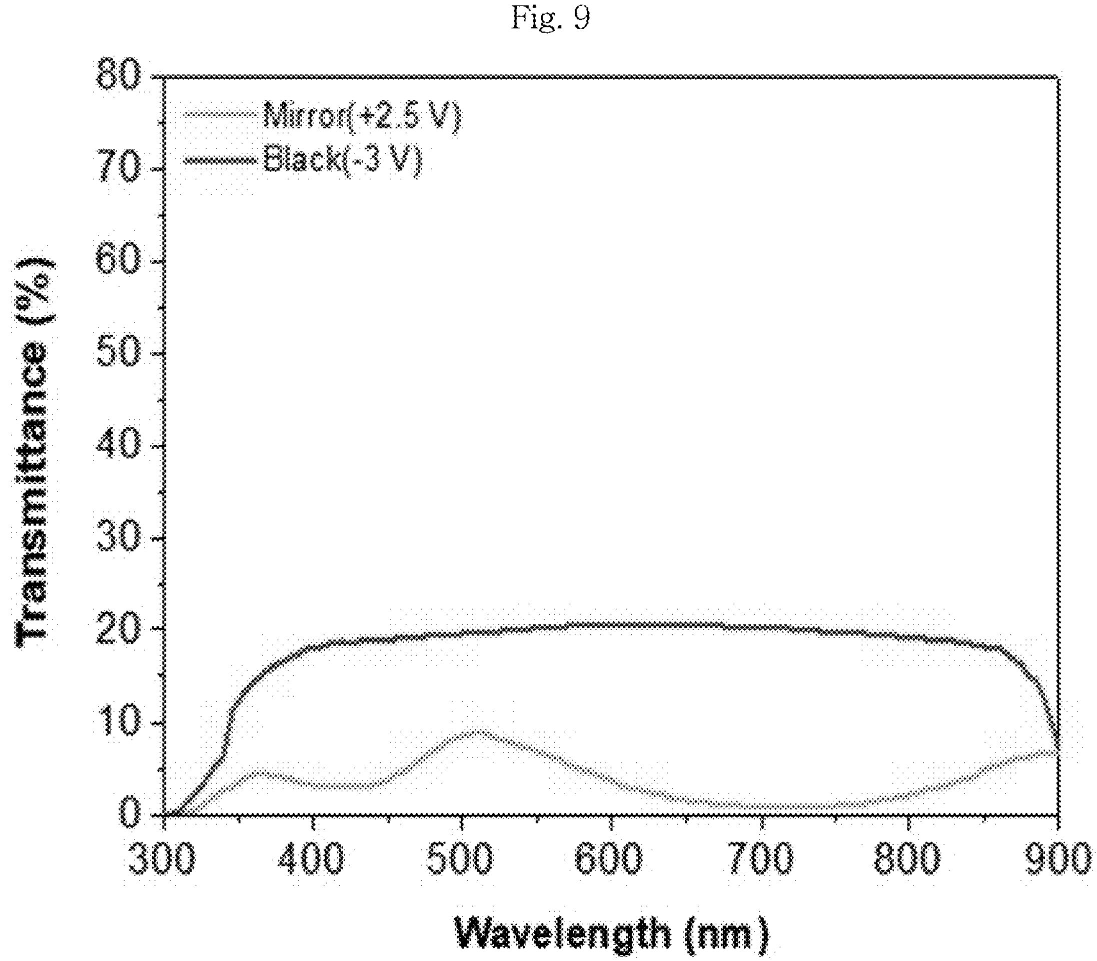
FIG. 9 is a graph showing optical characteristics when the smart electrochromic device according to Example 1 of the present invention is implemented in the black mode and mirror mode.

FIG. 9 is a graph showing optical characteristics when the smart electrochromic device according to Example 1 of the present invention is implemented in the black mode and mirror mode.

Referring to FIG. 9, after the smart electrochromic device according to Example 1 is prepared, transmittance (%) according to the wavelength (nm) of light applied to each of the black mode state Black and the mirror mode state Mirror is measured and shown.

As shown in FIG. 9, it is confirmed that, when the smart electrochromic device according to Example 1 is implemented in the black mode state and the mirror mode state, both of the transmittance for visible light wavelengths and the transmittance for near-infrared wavelengths are exhibited low.

Figure 10:
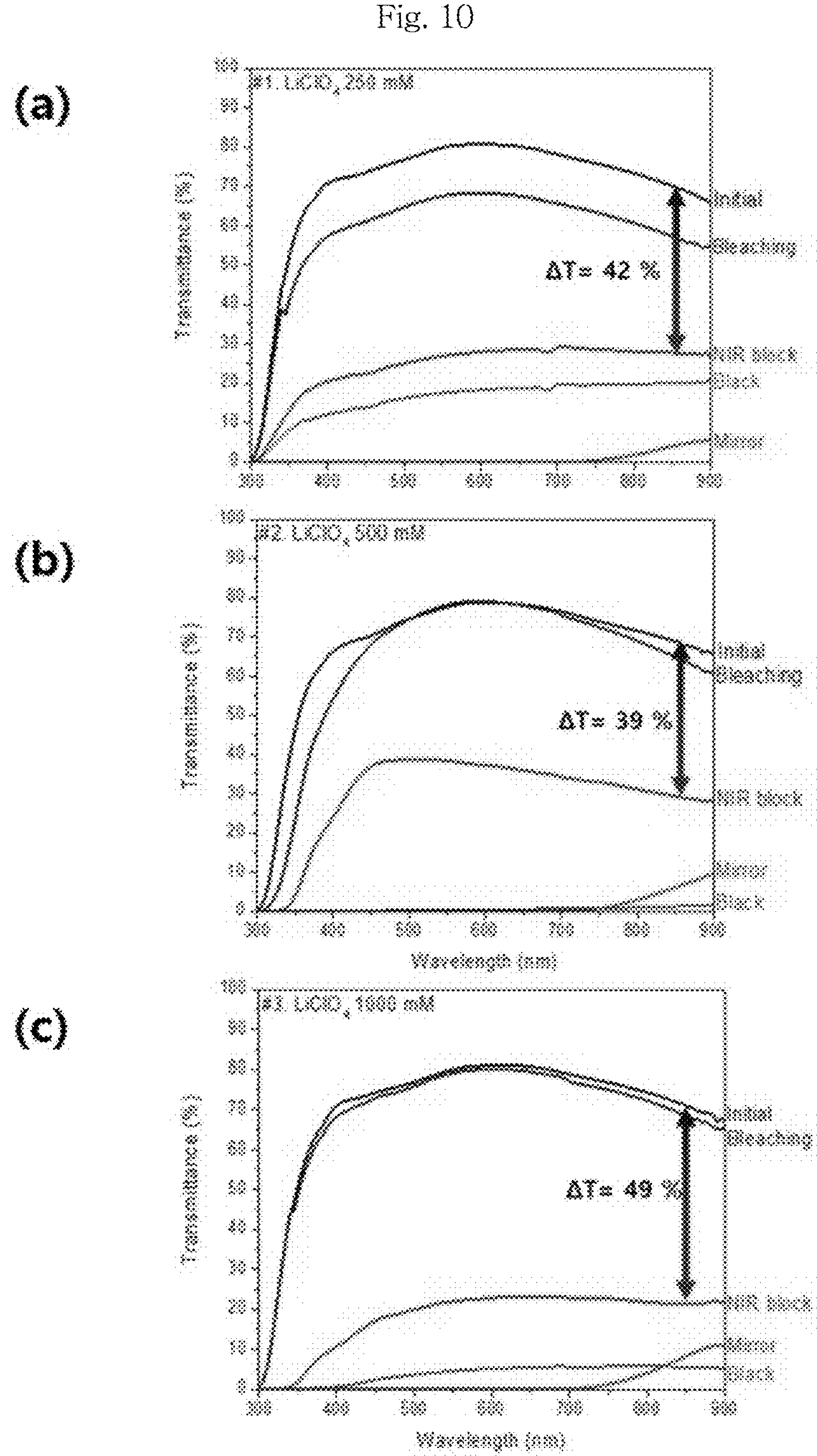
FIG. 10 shows graphs comparing the optical characteristics according to the concentration of LiClO4 contained in the electrolyte of the smart electrochromic device according to Example 1 of the present invention.

FIG. 10 shows graphs comparing the optical characteristics according to the concentration of LiClO4 contained in the electrolyte of the smart electrochromic device according to Example 1 of the present invention.

Referring to (a) to (c) of FIG. 10, optical characteristics of the smart electrochromic devices according to Examples 1-1, 1-2 and 1-3 are compared and shown, respectively. As can be seen in (a) of FIG. 10, it is confirmed that the smart electrochromic device according to Example 1-1 blocks up to the visible light wavelengths in a state of the near-infrared ray blocking mode NIR block, the black mode Black is not implemented, and the transmittance upon Bleaching is not recovered to the Initial level. In addition, as can be seen in (c) of FIG. 10, it is confirmed that the smart electrochromic device according to Examples 1-3 has no selectivity on the visible light wavelengths in a state of the near-infrared ray blocking mode NIR block, and the transmittance in a state of the black mode Black is lower than that of the smart electrochromic device according to Example 1-2.

Whereas, as shown in FIG. 10(*b*), it is confirmed that the smart electrochromic device according to Example 1-2 is selectively implemented in the near infrared ray blocking mode NIR block, the black mode Black, and the mirror mode Mirror.

As a result, it can be seen that, when the concentration ratio of LiClO4 to AgNO3 contained in the electrolyte is controlled to be greater than 1:5 (50 mM:250 mM) and less than 1:20 (50 mM:1000 mM), the near infrared ray blocking mode NIR block, the black mode Black, and the mirror mode Mirror are selectively implemented.

Figure 11:
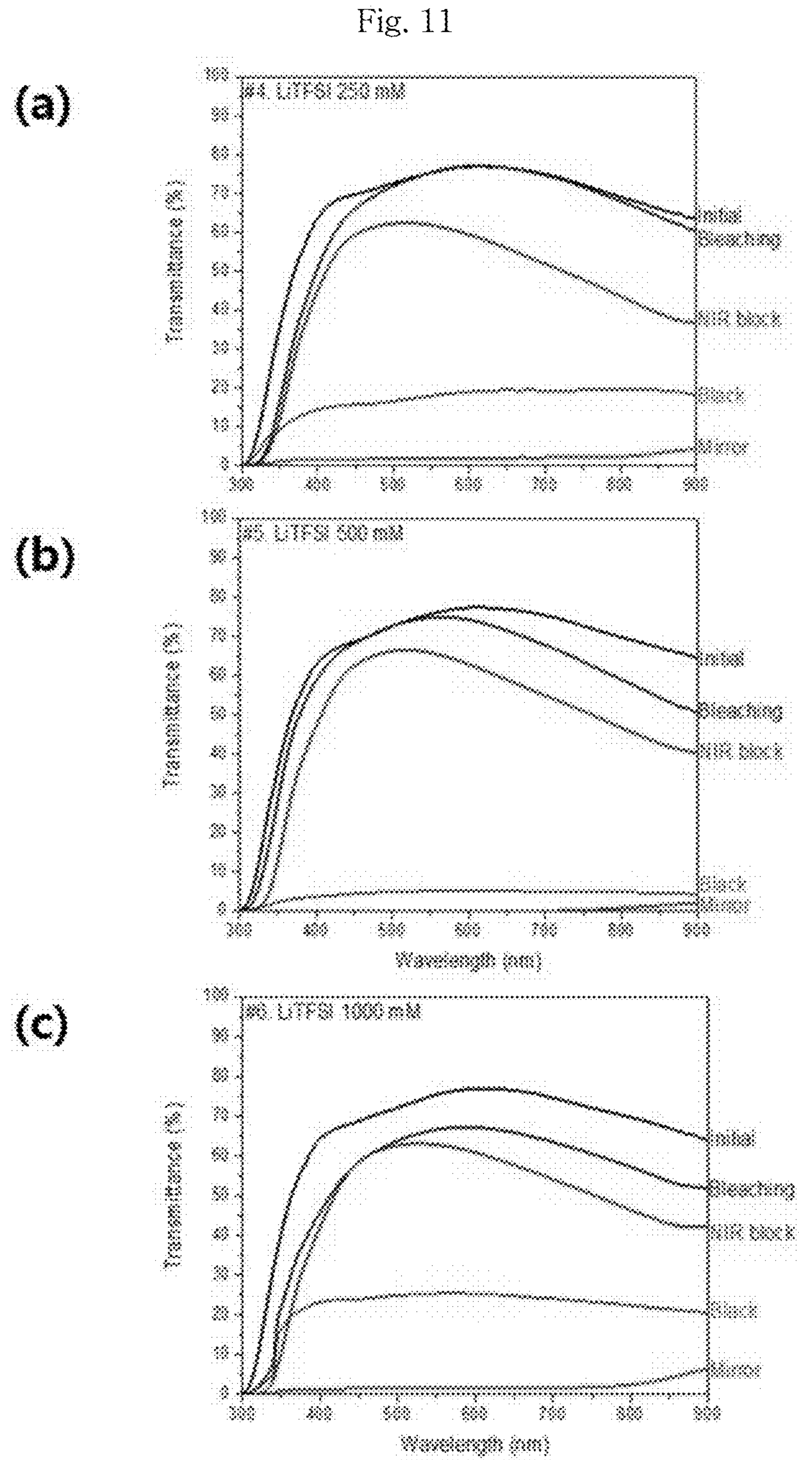
FIG. 11 shows graphs comparing the optical characteristics according to the concentration of Li-TFSI contained in an electrolyte of a smart electrochromic device according to Example 2 of the present invention.

FIG. 11 shows graphs comparing the optical characteristics according to the concentration of Li-TFSI contained in an electrolyte of a smart electrochromic device according to Example 2 of the present invention.

Referring to (a) to (c) of FIG. 11, optical characteristics of the smart electrochromic devices according to Examples 2-1, 2-2 and 2-3 are compared and shown, respectively. As can be seen in (a) to (c) of FIG. 11, it is confirmed that the near-infrared ray blocking mode NIR block can be easily implemented even when Li-TFSI is used. However, as can be seen in (a) and (c) of FIG. 11, it is confirmed that the smart electrochromic devices according to Example 2-1 and Example 2-3 are not implemented in the black mode Black. Whereas, it is confirmed that the smart electrochromic device according to Example 2-2 is selectively implemented in the near-infrared ray blocking mode NIR block, the black mode Black, and the mirror mode Mirror.

As a result, it can be seen that, when the concentration ratio of Li-TFSI to AgNO3 contained in the electrolyte is controlled to be greater than 1:5 (50 mM:250 mM) and less than 1:20 (50 mM:1000 mM), the near infrared ray blocking mode NIR block, the black mode Black, and the mirror mode Mirror are selectively implemented.

Figure 12:
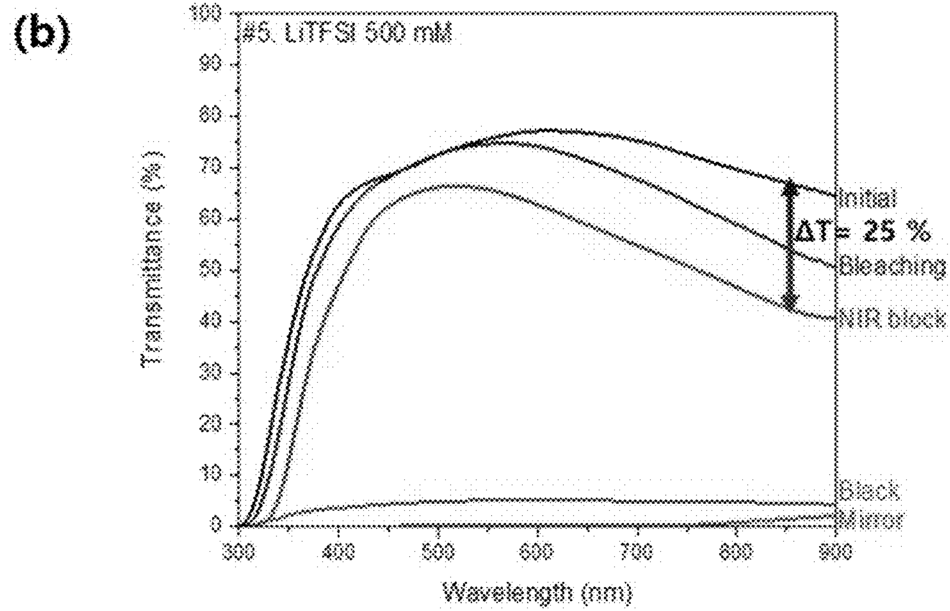
FIG. 12 shows graphs comparing the optical characteristics of the smart electrochromic devices according to Example 1 and Example 2 of the present invention.

FIG. 12 shows graphs comparing the optical characteristics of the smart electrochromic devices according to Example 1 and Example 2 of the present invention.

Referring to (a) and (b) of FIG. 12, optical characteristics of the smart electrochromic devices according to Examples 1-2 and 2-2 are compared and shown, respectively. As shown in FIGS. 12(*a*) and (*b*), it is confirmed that the smart electrochromic device according to Example 1-2 exhibits better characteristics in the near-infrared ray blocking mode NIR block mode and the black mode Black, compared to the smart electrochromic device according to Example 2-2. In addition, it is confirmed that the smart electrochromic device according to Example 1-2 exhibits a transmittance recovery ΔT of 39% during bleaching, and thus having more excellent characteristics than the smart electrochromic device according to Example 2-2 exhibiting a transmittance recovery ΔT of 25%.

As a result, it can be seen that the smart electrochromic device according to the embodiment has better optical characteristics when LiClO4 is used as the electrolyte than when Li-TFSI is used.

Figure 13:
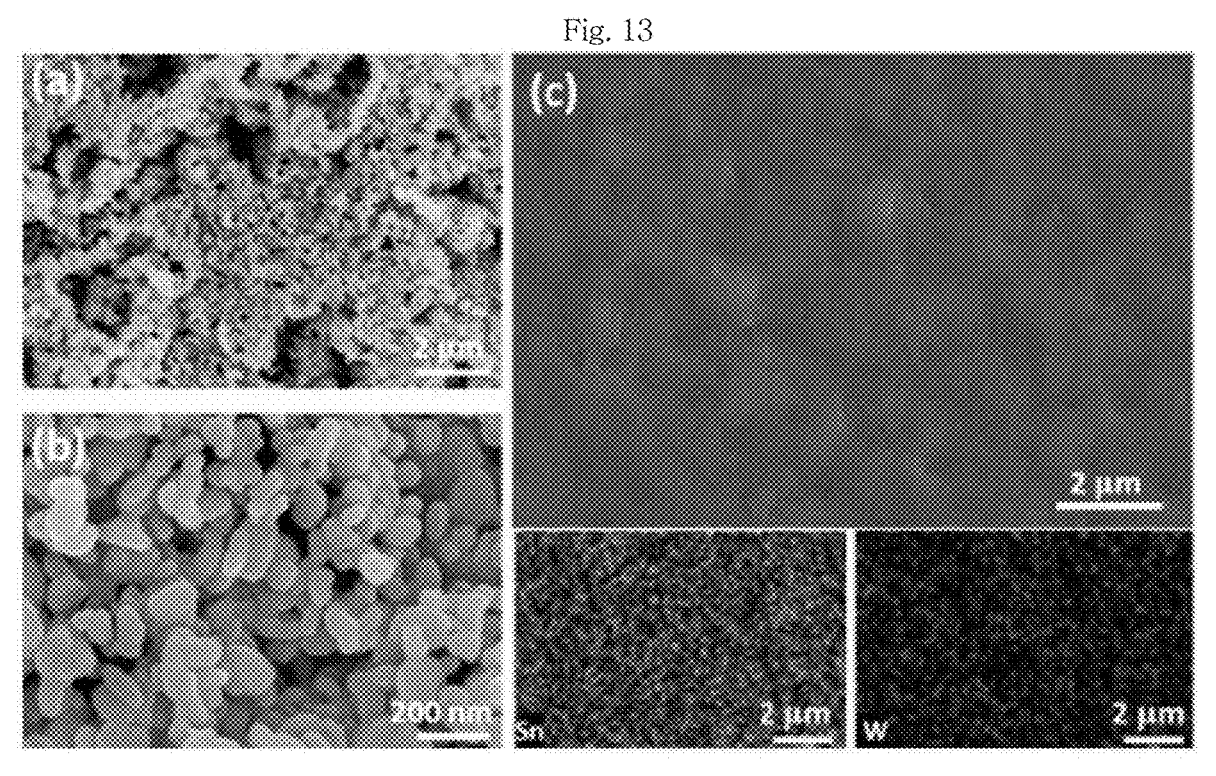

FIG. 13 shows images of an electrochromic layer of a smart electrochromic device according to Example 3 of the present invention.

Referring to (a) to (c) of FIG. 13, FE-scanning electron microscope (SEM) images and energy dispersive spectroscopy (EDS) mapping images of the electrochromic layer of the smart electrochromic device according to Example 3 are shown.

As can be seen in (a) to (c) of FIG. 13, it is confirmed that, in the electrochromic layer of the smart electrochromic device according to Example 3, WO3 particles are observed as WO3 powder is dry deposited. In addition, it is confirmed that tin Sn and tungsten W are observed in the EDS mapping images when the electrochromic layer is deposited on the FTO.

Figure 14:
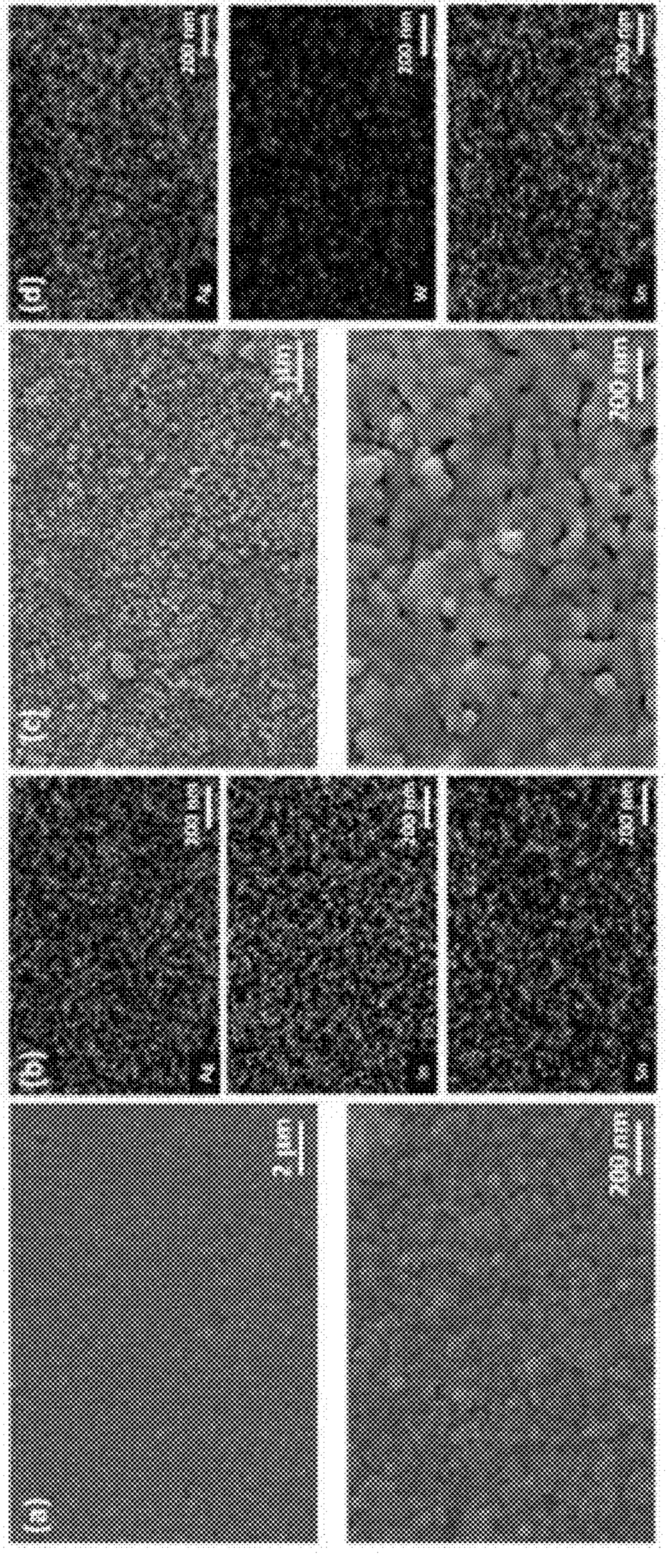
FIG. 14 shows images when the smart electrochromic device according to Example 3 of the present invention is implemented in the mirror mode and the black mode.

FIG. 14 shows images when the smart electrochromic device according to Example 3 of the present invention is implemented in the mirror mode and the black mode.

FIG. 14(*a*) shows an FE-SEM image and an EDS mapping image of ITO glass when the smart electrochromic device according to Example 3 is implemented in the mirror mode. FIG. 14(*b*) shows FE-SEM images and EDS mapping images of the WO3 electrochromic layer when the smart electrochromic device according to Example 4 is implemented in the black mode.

As can be seen in (a) of FIG. 14, it is confirmed that, when the mode is implemented in the mirror mode, silver (Ag) ions in the electrolyte move to ITO glass, and accordingly, silver (Ag) is detected in the ITO glass. Whereas, as can be seen in (b) of FIG. 14, it is confirmed that, when the mode is implemented in the black mode, silver (Ag) ions in the electrolyte move to the WO3 electrochromic layer, and accordingly, silver (Ag) ions are detected in the WO3 electrochromic layer.

Figure 15:
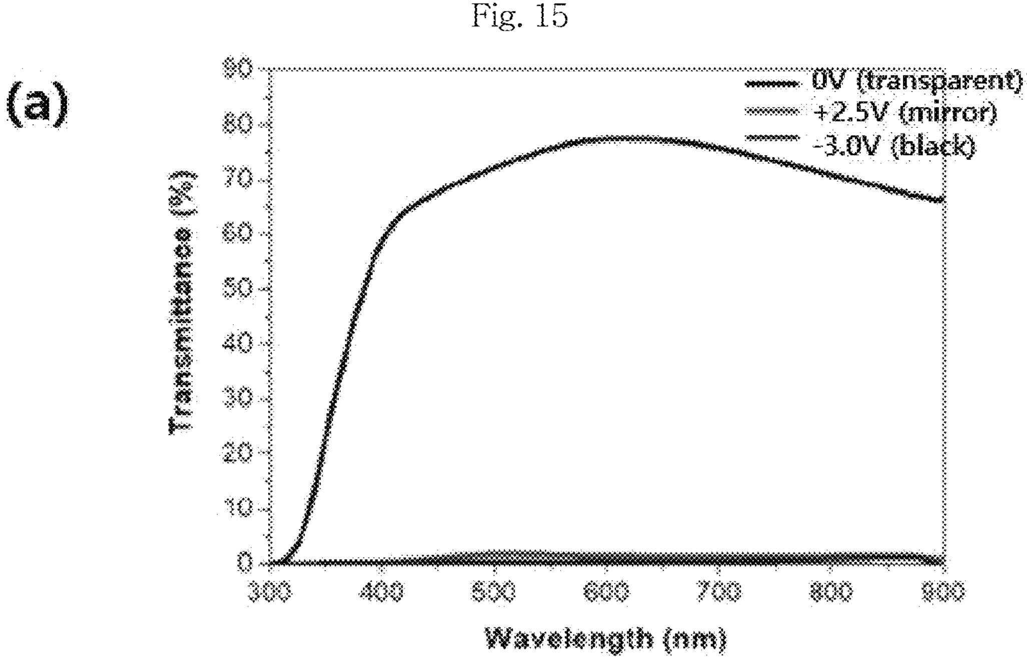
FIG. 15 shows graphs of the optical characteristics of the smart electrochromic device according to Example 3 of the present invention.
Figure 15:
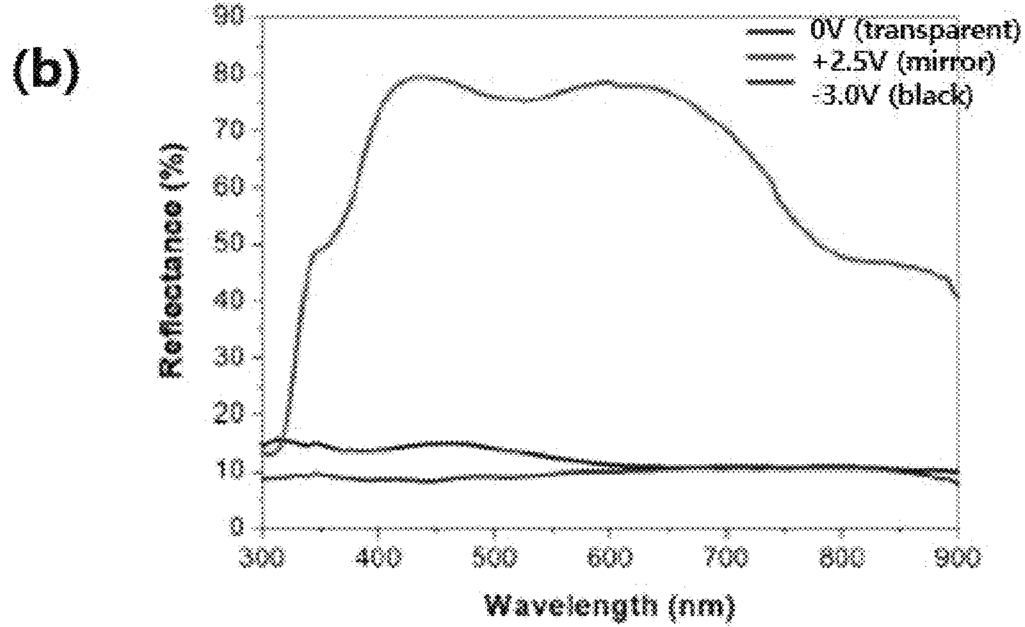

FIG. 15 shows graphs of the optical characteristics of the smart electrochromic device according to Example 3 of the present invention.

Referring to FIG. 15(*a*), after the smart electrochromic device according to Example 3 is prepared and then transmittance (%) according to the wavelength (nm) of light applied to each of the transparent mode state Transparent and the black mode state Black is measured and shown. Whereas, referring to FIG. 15(*b*), after the smart electrochromic device according to Example 3 is prepared and then reflectance (%) according to the wavelength (nm) of light applied to each of the transparent mode state Transparent and the black mode state Black is measured and shown.

As can be seen in (a) of FIG. 15, it is confirmed that the transmittance for the wavelength of 680 nm is exhibited high as 76.44% in the transparent mode, however, the transmittance for the wavelength of 680 nm is exhibited low as 0.51% and 1.26% in the black mode and the mirror mode, respectively.

On the contrary, as can be seen in (b) of FIG. 15, it is confirmed that the reflectance for the wavelength of 680 nm is exhibited low as about 10% in the transparent mode and the black mode, however, the reflectance for wavelengths of 680 nm and 440 nm is exhibited high as 73.1% and 77.2% in the mirror mode, respectively.

FIG. 16 is a graph showing the discoloration rate of the smart electrochromic device according to Example 3 of the present invention.

Referring to FIG. 16, after the smart electrochromic device according to Example 3 is prepared and then time switched from the transparent mode Transparent to the black mode Black and time switched from the transparent mode Transparent to the mirror mode Mirror are measured and shown. As shown in FIG. 16, it is confirmed that the time tc switched from the transparent mode to the black mode is 16 seconds, and the time tc switched from the transparent mode to the mirror mode is 35 seconds.

Figure 17:
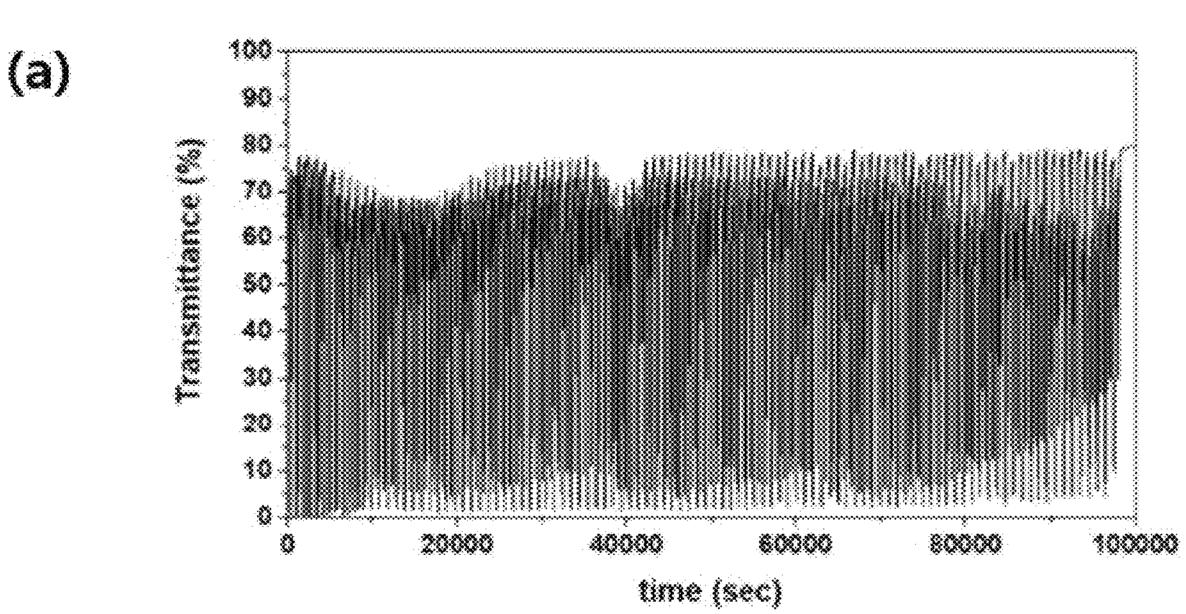
Figure 17:
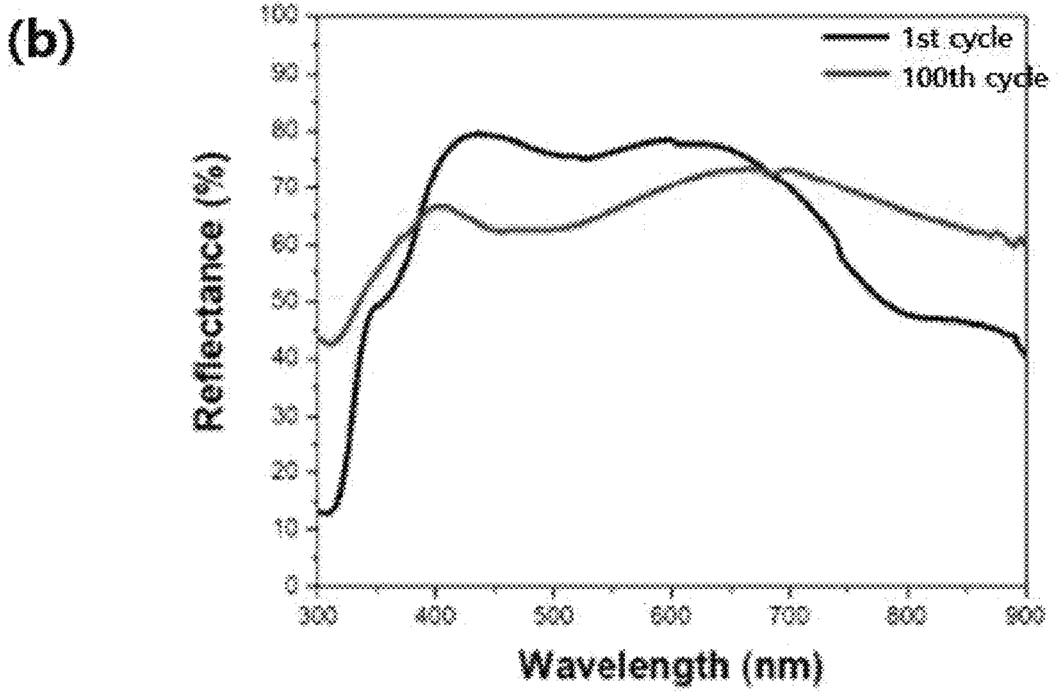
Figure 18:
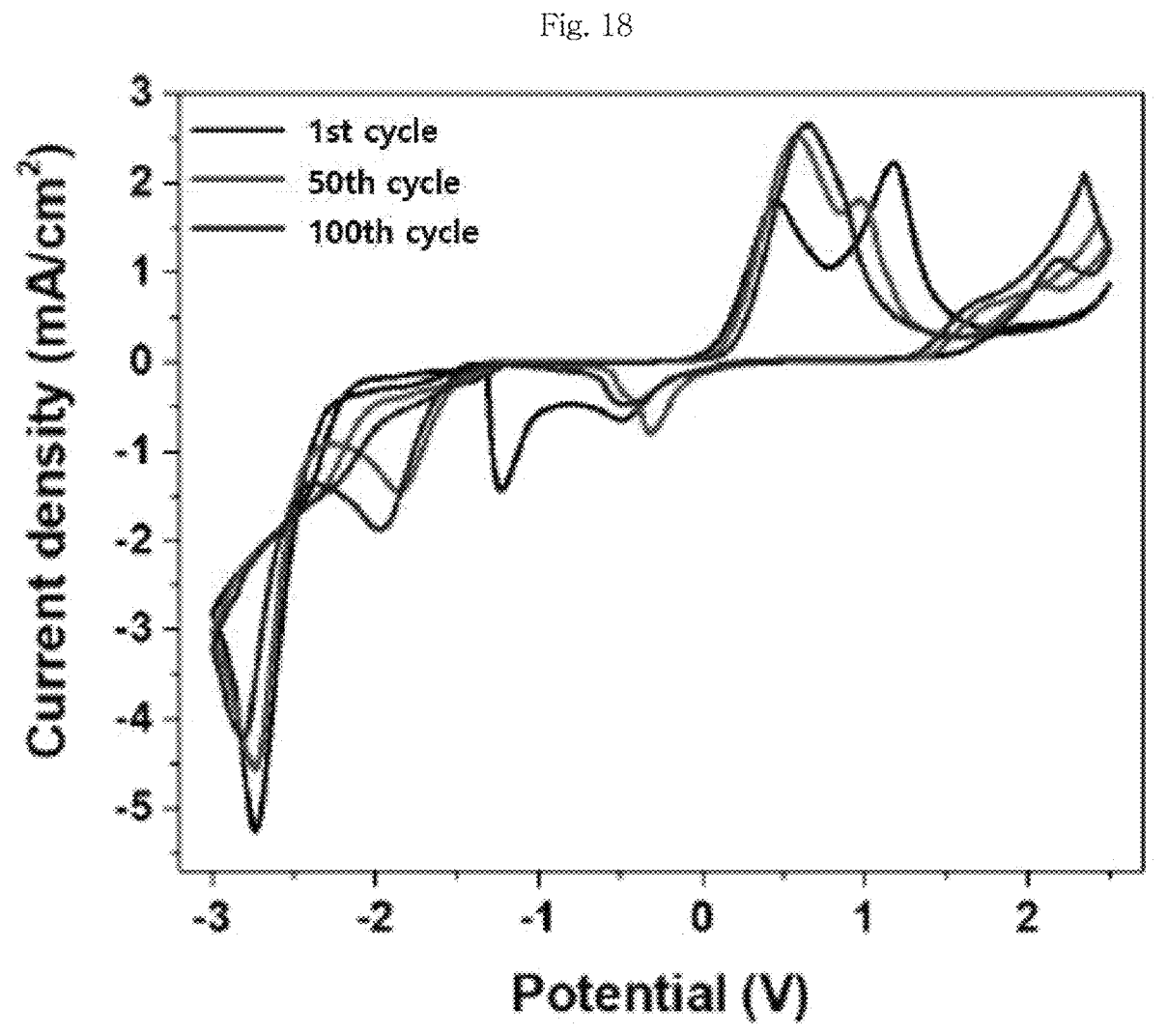

FIGS. 17 and 18 are graphs showing the stability of the smart electrochromic device according to Example 3 of the present invention.

Referring to FIG. 17(*a*), after the smart electrochromic device according to Example 3 is prepared and then changes in transmittance are measured and indicated during 100 switching cycles. Specifically, an operation in a sequence of transparent mode-black mode-transparent mode-mirror mode-transparent mode is defined as one switching cycle. In addition, the transparent mode after the black mode and the transparent mode after the mirror mode are defined as a bleached state.

As can be seen in (a) of FIG. 17, it is confirmed that, after 1 switching cycle, the transmittance in the bleached state after the black mode and the transmittance in the bleached state after the mirror mode are 74.5% and 73.5%, respectively. In addition, after 100 switching cycles, the transmittance in the bleached state after the black mode and the transmittance in the bleached state after the mirror mode are 73.1% and 79.6%, respectively. In addition, it is confirmed that the transmittances in the black mode after 1 switching cycle and after 100 switching cycles are 1.3% and 9.6%, respectively.

In other words, it is confirmed that the smart electrochromic device according to Example 3 has high stability in which the high transmittance (70% or more) is consistently exhibited in the bleached state and the low transmittance (10% or less) is consistently exhibited in the black mode, even when each mode is driven repeatedly.

Referring to FIG. 17(*b*), after the smart electrochromic device according to Example 3 is prepared and then changes in reflectance are measured and indicated during 100 switching cycles. Specifically, an operation in a sequence of transparent mode-mirror mode-transparent mode is defined as one cycle. In addition, the transparent mode after the mirror mode is defined as a bleached state.

As can be seen in (b) of FIG. 17, it is confirmed that the reflectance after 1 cycle for a wavelength of 680 nm is 73.1%, and the reflectance after 100 cycles is 72.7%. In other words, it is confirmed that the smart electrochromic device according to Example 3 has the high optical stability since the change in reflectance is not significantly exhibited during 100 cycles.

Referring to FIG. 18, after the smart electrochromic device according to Example 3 is prepared and then each cyclic voltammetry is measured at a scan rate of 100 mV/s after 1 cycle, 50 cycles and 100 cycles. As shown in FIG. 18, it is confirmed that current densities are exhibited as 77.68, 84.31, and 88.17 mC/cm2 after 1 cycle, 50 cycles, and 100 cycles, respectively. In other words, it is confirmed that the smart electrochromic device according to Example 3 has the high electrical stability since the change in current density is not significantly exhibited during 100 cycles.

Although the present invention has been described in detail using exemplary embodiments, the scope of the present invention is not limited to the specific embodiments, and shall be interpreted by the appended claims. In addition, it will be apparent that a person having ordinary skill in the art may carry out various deformations and modifications for the embodiments described as above within the scope without departing from the present invention.

INDUSTRIAL APPLICABILITY

The electrochromic device according to the smart electrochromic device and the manufacturing method thereof according to an embodiment of the present application may be used in various industrial fields such as household glass, industrial glass, military glass, and medical glass.

The invention claimed is:

1. A smart electrochromic device comprising:

a first electrode and a second electrode disposed facing each other;

an electrochromic layer disposed between the first electrode and the second electrode, the electrochromic layer containing a metal oxide; and an electrolyte disposed between the second electrode and the electrochromic layer, the electrolyte containing silver (Ag), lithium (Li), and a solvent, and wherein the electrolyte includes bis(trifluoromethanesulfonyl) imide (TFSI) ions as counter ions for the Li, wherein a molar ratio of the Ag to the Li is greater than 1:5 and less than 1:20, and wherein transmittance and reflectance for visible light wavelengths and transmittance and reflectance for near-infrared ray wavelengths are capable of being selectively controlled according to movements of at least one of silver ions or lithium ions in the electrolyte.

2. The smart electrochromic device of claim 1, wherein the smart electrochromic device:

is capable of being operated in a near-infrared ray blocking mode when voltage is applied to the first electrode and the second electrode so as to cause the lithium ions to move from the electrolyte to the electrochromic layer, and transmits visible light wavelengths and blocks near-infrared wavelengths when operating in the near-infrared ray blocking mode.

3. The smart electrochromic device of claim 1, wherein the smart electrochromic device:

is capable of being operated in a black mode when voltage is applied to the first electrode and the second electrode so as to cause the silver ions and the lithium ions to move from the electrolyte to the electrochromic layer, and has transmittance of 1% or less for visible light wavelengths and reflectance of 10% or less for visible light wavelengths when operating in the black mode.

4. The smart electrochromic device of claim 1, wherein the smart electrochromic device:

is capable of being operated in a mirror mode when voltage is applied to the first electrode and the second electrode so as to cause the silver ions to move from the electrolyte to the second electrode, and has transmittance 2% or less for visible light wavelengths and reflectance of 70% or more for visible light wavelengths when operating in the mirror mode.

5. The smart electrochromic device of claim 1, wherein the smart electrochromic device:

is capable of being operated in a transparent mode when no voltage is applied to the first electrode and the second electrode such that the silver ions and the lithium ions do not move in the transparent mode, and has transmittance of 70% or more for visible light wavelengths and reflectance of 15% or less for visible light wavelengths in the transparent mode.

6. The smart electrochromic device of claim 1, wherein a plurality of particles of the metal oxide are observed in the electrochromic layer.

7. The smart electrochromic device of claim 1, wherein the metal oxide includes tungsten oxide ($WO_3$).

8. The smart electrochromic device of claim 1, wherein the electrolyte includes nitrate ($NO_3$) ions as counter ions for the Ag.

* * * * *